(No Model.)
A. W. LEWIS.
MANUFACTURE OF PIPE.
No. 351,987. Patented Nov. 2, 1886.
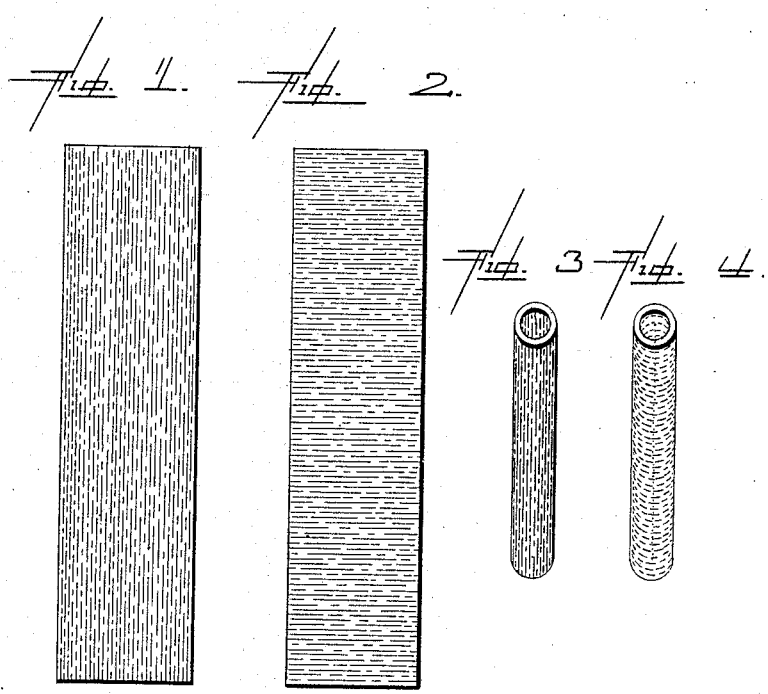

UNITED STATES PATENT OFFICE.

ARTHUR WILLIAM LEWIS, OF BRADFORD, PENNSYLVANIA.

MANUFACTURE OF PIPE.

SPECIFICATION forming part of Letters Patent No. 351,987, dated November 2, 1886.

Application filed July 13, 1886. Serial No. 207,887. (No model.)

*To all whom it may concern:*

Be it known that I, ARTHUR WILLIAM LEWIS, of Bradford, in the county of McKean and State of Pennsylvania, have invented certain new and useful Improvements in the Manufacture of Pipe; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of pipe; and it consists in, first, shearing the skelp from the rolled plate so that the grain of the iron will run at an angle to its length, so that when the skelp is made into a pipe the grain of the metal will run parallel to its circumference; second, as a new article of manufacture, a pipe made from metal in which the grain runs around, in contradistinction to extending the length of the pipe.

The object of my invention is to produce a pipe in which the grain of the metal extends parallel with its circumference, whereby the pipe is made stronger and less liable to burst when a very heavy pressure or strain is applied thereto, and thus especially adapting it for use in oil, gas, and Artesian wells.

Figures 1 and 2 show skelps in which the grains of the metal extend at right angles to each other. Figs. 3 and 4 are side elevations of pieces of pipe, showing the grains of the metal extending in opposite directions.

In the manufacture of pipe heretofore the skelp has been cut so that the grain of the metal extends from end to end, as shown in Fig. 1. When this skelp is made into a pipe, as shown in Fig. 3, by any of the known processes for manufacturing pipe, the grain of the metal extends from one end of the pipe to the other. When any great or unusual strain is applied to a pipe constructed in this manner, the pipe is liable to burst, and hence is objectionable for this reason. In order to overcome this defect, I shear my skelp from a rolled plate, so that the grain of the metal will extend at right angles to its length, as shown in Fig. 2. When this skelp is made into a pipe, as shown in Fig. 4, the grain of the metal extends around the pipe, or parallel with its circumference. When any great strain is applied to a pipe made in this manner, instead of the strain having a tendency to split or burst the metal, it has a tendency to rupture or break the cohesion of the particles which form the iron, and as a much higher strain or greater pressure is necessary to do this than it is to simply split the grain of the metal, it will readily be seen that a pipe with the grain of the metal extending parallel with its circumference is much stronger than a pipe in which the grain of the metal extends from one end of the pipe to the other. In pipes where the grain extends from one end of the pipe to the other the tendency when a heavy strain is applied to it is to split the pipe; but where the grain extends around the pipe, as shown in Fig. 4, it is almost impossible to split the pipe, owing to the shortness of the length of the grain, and hence pipe having the grain extending parallel with its circumference will stand an almost unlimited pressure, because it is almost impossible to split the metal. Pipe with the grain extending parallel with its circumference is especially adapted for use in connection with oil and gas wells, and in all places where there is a great pressure. As pipes constructed in this manner have a greater strength or resisting power, they can be made of lighter metal than is employed in making pipes of a similar size where the grain of the metal extends from one end of the pipe to the other.

Having thus described my invention, I claim—

1. The method herein described of making metal pipes, consisting in shearing the skelp from the plate so that the grain of the metal will extend at an angle to its length, and then forming the skelp into a pipe in which the grain of the metal extends parallel with its circumference, substantially as described.

2. As a new article of manufacture, a metal pipe in which the grain of the metal extends parallel with its circumference, substantially as shown.

In testimony whereof I affix my signature in presence of two witnesses.

ARTHUR WILLIAM LEWIS.

Witnesses:
EDWARD M. SWEENEY,
BENJAMIN S. COFFIN,